3,444,781
TOOL HOLDER
Elwin Sunderman, Inglewood, and Merle Hilliard, Los Angeles, Calif., assignors to Sonnet Tool & Manufacturing Company, Hawthorne, Calif.
Filed Oct. 19, 1967, Ser. No. 681,046
Int. Cl. B23c 7/00; B23b 31/02, 5/22
U.S. Cl. 90—11                                    13 Claims

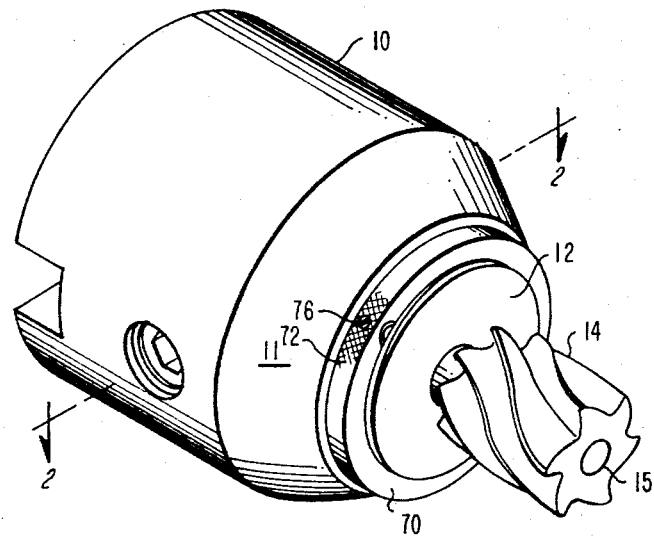
FIG.—1
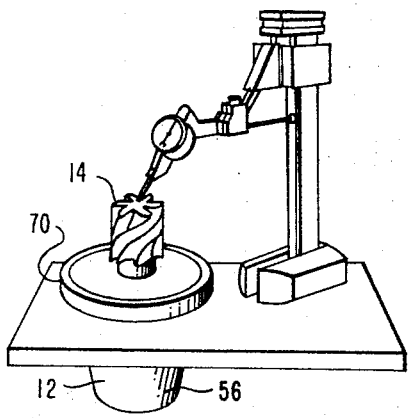
FIG.—6
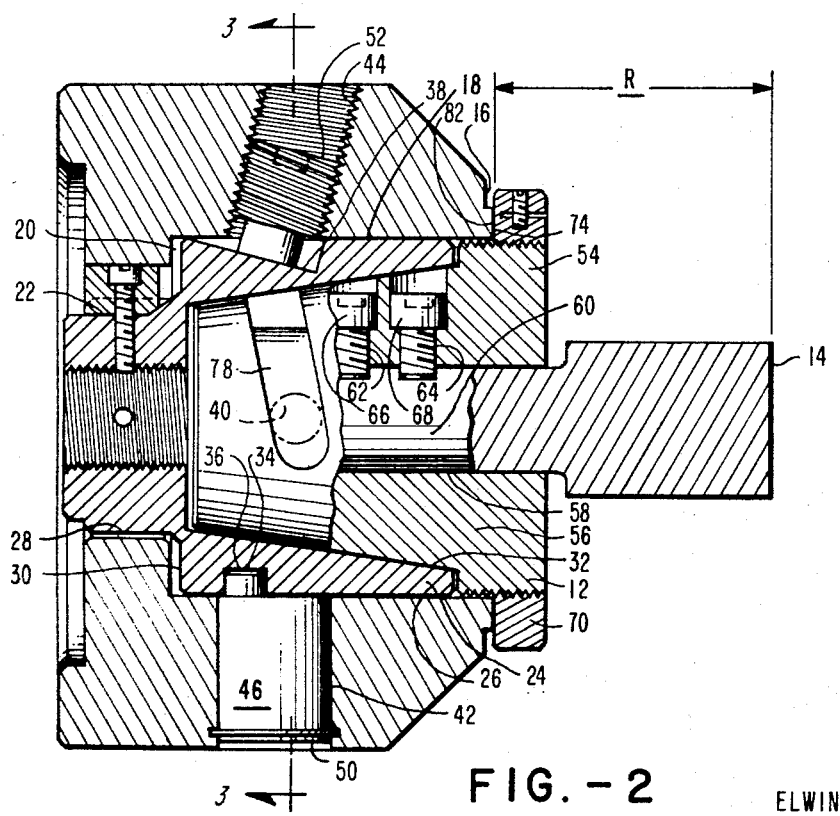
FIG.—2

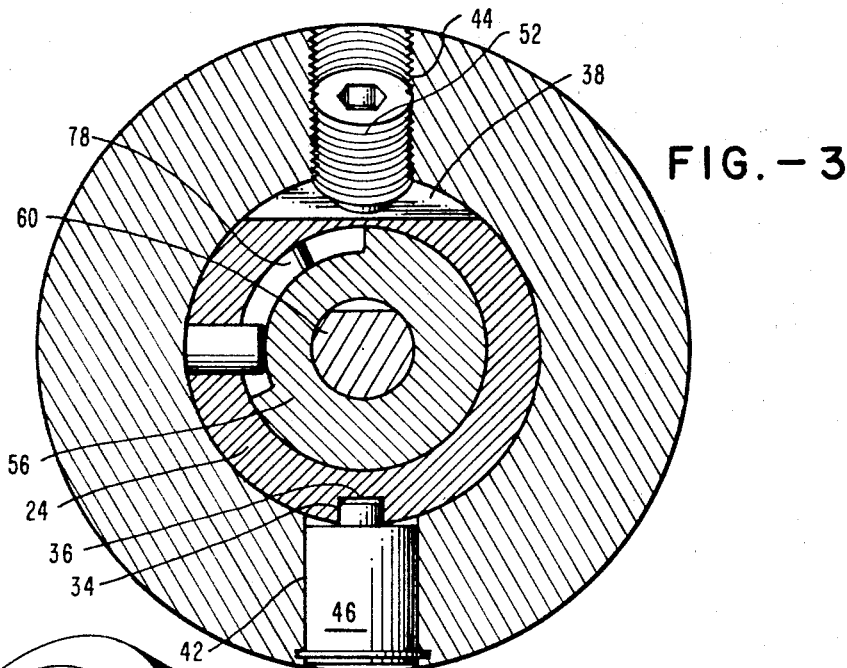
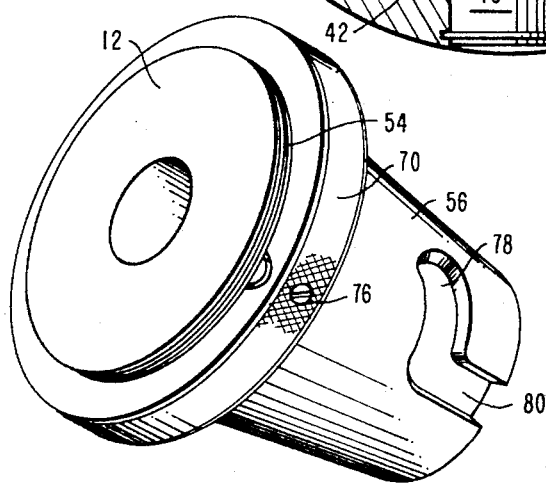
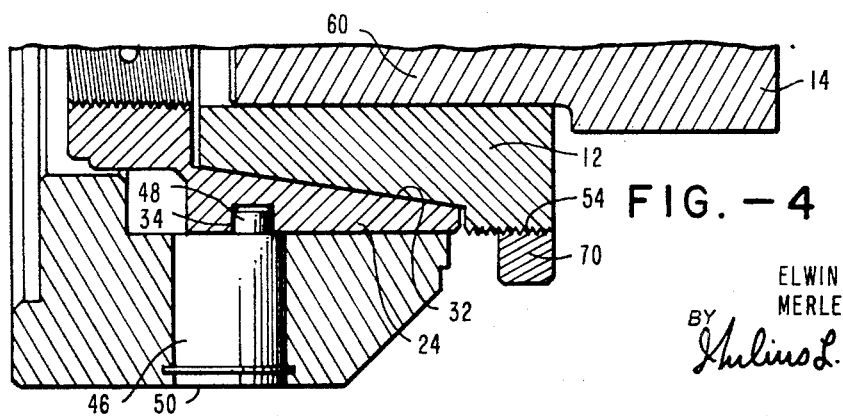
FIG.-3
FIG.-5
FIG.-4
INVENTORS
ELWIN SUNDERMAN
MERLE HILLIARD
BY Julius L. Rubinstein
ATTORNEY

United States Patent Office 3,444,781
Patented May 20, 1969

ABSTRACT OF THE DISCLOSURE

A tool holder including a spindle adapter, a socket received therein having a tapered bore, and a tool holder portion received in said tapered bore. Means to compensate for tool wear are provided to adjustably maintain the distance between the end of a tool received in said holder portion and a face on the adapter coacting with the tool holder portion. Quick release means are provided to separate the tool holder portion from the tapered socket.

This invention relates generally to tool holders of the kind used in large machining operations and more particularly to a quick release tool holder.

---

This invention is characterized by a tool holding portion comprising a first threaded cylindrical portion with an integrally formed tapered or conical stem. The tool holding portion is provided with a central bore for receiving the stem of the tool and set screws are provided for locking the stem of the tool in the bore. A cylindrical adjusting nut is threaded onto the threaded cylindrical portion and this nut has a flat surface for engaging a reference flat surface. The external surface of the conical stem is provided with a bayonet slot.

A cup is provided, having a generally cylindrical external periphery and a centrally disposed tapered or conical bore shaped to receive the conical stem. This cup is provided with an integrally mounted pin which is designed to penetrate the bayonet slot on the periphery of the conical stem to quickly and releasably lock the tapered or conical portion of the tool holding portion in the cup.

The cup is movably mounted in an adapter. The base portion of the adapter is adapted to be bolted onto the spindle of a machine tool. The adapter is provided with a flat surface adapted to engage the flat surface of the cylindrical adjusting nut to provide a reference plane. By rotating the cylindrical adjusting nut on the threaded cylindrical portion of the tool holder the distance between the flat surface of the nut and the work contacting end of the tool can be varied to compensate for wear and adjust and preset. However, this variation changes the axial position of the tapered stem in the conical bore and therefore changes the axial position of the entrance to the bayonet slot. Consequently, in order to permit the tool holding portion to be releasably locked in the cup, means are provided to move the cup longitudinally along the axis of the adapter. In this way the fixed pin can always be moved with the cup so it can enter the entrance to the bayonet slot to releasably lock the tool holding portion to the cup. Then the cup with the tool holding portion mounted therein can be moved so that the flat surface of the cylindrical adjusting nut engages and is stopped by the flat reference surface on the adapter.

Brief summary

Large scale machine operations have heretofore utilized massive adapters which were bolted onto the ends of driving spindles. Since cutting tools wear with use it is necessary that tool holders be provided with some adjustment to compensate for wear and preset. Heretofore the tool holders were generally cylindrical in shape and included a threaded portion on which a nut was threaded. One end of this nut had a flat surface which was designed to engage a flat reference surface on the adapter.

The adapter was provided with a cylindrical bore which was sized to receive the cylindrical stem of the adjustable tool holder. However, the tolerances involved were very close. In addition the tool holder and tool were heavy and were suspended below the adapters. Consequently, the removal of the tool holders and tool and it's replacement was time consuming and difficult. This operation was particularly costly when the tool holders and tool to be replaced was mounted in multiple spindle machines containing a large number of cutting tools because any replacement required the entire machine tool to be shut down for an extended period.

It had been recognized that if the stem of the tool holder was conical or tapered, and the bore of the adapter was conical or tapered and shaped to closely receive the tool holder, the problem of a speedy replacement of a tool holder and tool could be solved. However, precision machine work requires the tool holder to be adjustable to provide compensation for wear and preset adjustment, and it is not easy to combine the advantages of a tool holder with a conical stem which must fit into a conical bore, with the requirement that the adapter rigidly hold the tool holder and tool in position and at the same time permit precision adjustment of the tool and the tool holder to compensate for wear and preset adjustment.

In this invention an adapter is provided which in practice is bolted onto the end of a spindle. The adapter is provided with a bore in which a cup is mounted for axial movement. The cup is provided with a tapered or conical bore. In addition, a tool holding portion is provided which has an externally threaded cylindrical portion and an integrally attached tapered or conical stem portion. The tool holding portion is provided with a centrally disposed bore for receiving the stem of a tool and the stem of a tool is locked in the bore by means of set screws. A nut is threaded onto the cylindrical portion and this nut is provided with a flat surface. The tapered stem portion of the tool holding portion is sized to closely fit in the conical bore and the tapered stem is provided with a bayonet slot formed on its periphery. A pin is rigidly mounted inside the cup and the pin is designed to penetrate the bayonet slot formed on the tapered stem to quickly and releasably lock the tapered stem of the tool holding portion in the cup. The adapter is also provided with a flat reference surface which is designed to engage the flat surface of the nut to serve as a stop and to establish a reference plane with respect to the work contacting end of the tool.

When the nut is rotated, the distance between the flat surface on the nut and the work contacting end of the tool can be varied to compensate for wear and for preset adjustment. However, this variation changes the axial position of the entrance to the bayonet slot in the cup. Consequently, in order for the fixed pin in the cup to enter the bayonet slot so that the tool holding portion can be locked in the cup, a mechanism is provided for moving the cup longitudinally in the adapter. In this way, despite the adjustment of the tool holder, the tool holding portion can be quickly and easily, releasably locked inside the cup in the adapter, with the flat surface of the nut bearing against the flat surface of the adapter so that the distance between the reference plane and the work contacting end of the tool remains constant.

What is needed therefore and among other things comprises an important object of this invention is to provide a quickly removable and replaceable adjustable tool holder for heavy duty machine tools.

This and other objects of this invention will become better understood in the light of the accompanying drawings, wherein:

FIGURE 1 is a perspective view of a tool holder holding a tool mounted inside an adapter.

FIGURE 2 is a cross-sectional view showing the adjustable tool holder mounted in the adapter.

FIGURE 3 is a sectional view taken on line 3—3 of FIGURE 2.

FIGURE 4 is a sectional view of a portion of the tool holder and adapter showing the mechanism for moving the cup portion holding the tool holding portion.

FIGURE 5 is a perspective view of the tool holding portion showing the adjusting nut and the bayonet slot on the conical stem.

FIGURE 6 is a perspective view showing the tool holding portion and tool being adjusted to compensate for wear and preset adjustment.

Referring now to FIGURE 1 of the drawing, an axially extending adapter indicated generally by the reference numeral 10 is, in the embodiment shown, generally cylindrical in shape. The front end portion 16 of the adapter is designed to receive a tool holder 12 in which a tool 14 is mounted. The rear portion of the adapter (not shown) is provided with suitable means for attachment to the spindle of the machine tool. The front portion 16 of the adapter is provided with a centrally disposed bore 18, see FIGURE 2. The base 20 of bore 18 is provided with a smaller bore 22 concentric with base 18 for reasons to be described below.

A cup 24 having a generally cylindrical outer surface 26 and an integrally attached boss 28 is slidably mounted in bore 18. The base 30 of the cup is adapted to move into engagement with the base 20 of bore 18 as the boss 28 of the cup slidably moves inside bore 22. The cup 24 is provided with a centrally disposed tapered or conical bore or socket 32. In addition, a groove 34 with a straight flat base is cut into one outer cylindrical surface of the cup. Groove 34 is cut so that the base of the groove is in a plane parallel to the axis of the cup and extends in a direction perpendicular to a plane containing the axis of the cup.

A flat locking surface 38 is formed on the cylindrical wall of the cup on the side opposite groove 34. In addition, a pin 40 is rigidly secured to the cup projecting inwardly into the conical bore of tapered socket 32 radial to the axis of the cup, see FIGURE 3.

The cylindrical wall of the adapter 10 is provided with a first smooth radial bore 42 and a second threaded bore 44 inclined to the axis of the adapter. A generally cylindrical plug 46 having an eccentric cylindrical pin or projection 48 is sized to fit smoothly in bore 42 with the projection 48 fitting inside groove 34. The diameter of projection 48 is substantially equal to the thickness of the groove 34. The outer surface 50 of the plug 46 is provided with a bore (not shown) shaped to receive an Allen wrench whereby the plug 46 may be rotated. With this arrangement the rotation of plug 46 causes cup 24 to reciprocate axially inside adapter 10.

A threaded plug 52 is threaded in bore 44 and is designed to press against the flat surface 38 so that the cup 24 can be locked in any axial position in the adapter 10.

With the arrangement described to this point, when plug 52 is not bearing against surface 38, rotation of plug 46 by means of a suitable Allen wrench causes cup 24 to move axially up and down the bore 18 for reasons to be described below. However, by means of plug 52, the cup can be locked in any axial position.

The tool holding portion 12 has an externally threaded cylindrical portion 54 which merges into an integral tapered end or conical portion 56. The tapered portion 56 is sized to closely fit inside bore 32 in cup 24. The tool holder is provided with a centrally disposed cylindrical bore 58 for receiving the stem 60 of a tool. In addition, axially spaced threaded bores 62 and 64 are provided to communicate with bore 58. Set screws 66 and 68 are threaded in bores 62 and 64 for engagement with the stem 60 of tool 14 so that the tool may be locked in the tool holder.

A cylindrical nut 70 with a serrated outer surface 72 is threaded onto the threaded cylindrical portion 54 of the tool holder for axial movement. The surface 74 of nut 70 is machined flat for reasons to be described below. A set screw arrangement 76 is mounted in nut 70 to lock the nut in any desired rotative position for reasons to be described below, see FIGURE 5.

As best seen in FIGURE 5, a bayonet slot 78 is cut into the tapered portion 56 of the tool holder. This bayonet slot is designed to receive pin 40 projecting into bore 32 so that the tool holder can be locked inside the cup by aligning the entrance 80 of bayonet slot 78 with the pin and then rotating the tool holder until the pin moves toward the end of the slot.

The front end of adapter 10 is provided with a machined flat surface 82 which serves as a stop and is designed to engage the flat surface 74 of the cylindrical nut 70 to establish a reference plane with respect to the work contacting end 15 of the tool.

When the machine tool is properly set for a particular piece of work, the distance R from the reference plane to the work contacting end of the tool 14 must be maintained, see FIGURE 2. However, when the tool 14 wears or becomes dull or must be preset, the tool holder and tool must be removed, reshaped, and reset for reinsertion in the cup 24. After the tool has been resharpened or reset, the tool 42 with the tool mounted therein is placed on a flat table having a hole therein through which the conical portion 56 extends, see FIGURE 6. The flat surface 74 of the nut 70 rests on the table and a suitable dial indicator is provided so that by adjustment of the nut the precise reference distance R can be obtained. Thereafter the nut is locked in it's rotative position and the tool holder 12 and tool 14 are reinserted in the cup 24.

Precision setting of tool 14 requires the flat surface 74 of the nut 70 to bear against the flat surface 82 of the adapter. However, because the nut 70 must be adjusted on the cylindrical portion 54 of the tool holder, the distance between the flat surface 74 of the nut and the entrance 80 of the bayonet slot will vary. Since the pin 40 is fixed, in the particular embodiment shown, when the nut 70 is in some positions on the cylindrical portion 74, the pin 40 would not be in position to enter the bayonet slot. It is for this reason that the cup 24 is mounted for axial adjustment. By reason of the axial adjustment of the cup 24, the pin 40 can always be moved into the bayonet slot 78 regardless of the position of the nut 70 on the cylindrical portion 54, and the flat surfaces 74 and 82 can then be moved into engagement by retracting the cup to provide a reference plane with the required distance to the work contacting end of the tool.

Furthermore, the conical taper of the tool holder permits it to be easily inserted in the conical socket of the cup 24. Consequently, a rapid exchange of the tool holder and tool with a minimum amount of down time is made possible. This is of great importance, as stated above, when there are a great many adapter and tools controlled by one machine.

Although the particular embodiment illustrated has utilized a fixed pin in an axially movable cup which can penetrate a bayonet slot on the tapered stem of the tool holding portion, the invention can be practiced with other arrangements, so long as some axially adjustable means are provided which are associated with the tapered socket and the tapered end of the tool holding portion for releasably locking the tapered end of the tool holding portion inside the tapered socket. For example, it is contemplated that the invention could be practiced with a fixed tapered socket in which a pin is mounted for axial adjustment to allow it to enter the bayonet slot in the tapered stem of the tool.

It is also contemplated that the invention can be practiced with an adapter having a tapered portion and the tool holding portion having a fixed or movable tapered socket so long as some axially adjustable means are provided for releasably locking the tapered portion in the tapered socket for releasably locking the adapter and the tool holding portion together.

Obviously many modifications and variations of the present invention are possible in thet light of the above teachings. It is therefore to be understood that within the scope of the appended claims the invention can be practiced otherwise than as specifically described.

We claim:

1. An apparatus of the class described comprising in combination an axially extending adapter, one end of said adapter having a bore formed therein, a cup movably mounted in said bore, said cup having a tapered interior serving as a tapered socket, a tool holding portion, said tool holding portion having a tapered end sized to fit closely inside the tapered socket of said cup and having means thereon for releasably holding an axially extending tool, fixed means in said cup for engaging a fixed portion of said tapered end of said tool holding portion to releasably lock the tapered end inside said tapered socket, axially adjustable means on said tool holding portion for adjusting the distance between a part of said axially adjusting means and the work contacting end of the tool locked in said tool holding portion, said one end of the adapter having a means thereon for coacting with said axially adjustable movable means to provide a stop and to establish a reference plane on said adapter with respect to the work contacting end of the tool, means for axially moving said cup so said fixed means can engage said fixed portion of said tapered end of said tool holding portion to releasably lock said tapered end in said cup regardless of the adjustment of said axially movable means on the tool holding portion whereby when the tool needs to be repaired or preset the tool holding portion with the tool inside is released from the tapered socket and after repair or preset the axially adjustable means is readjusted to re-establish the distance between said part of said axially adjustable means and the end of said repaired tool and then the tapered end of the tool holding portion is then reinserted inside the tapered socket while the cup is moved so the fixed means on said cup engages said fixed portion of said tapered end so that the tapered end of the tool holding portion is locked inside the cup and the cup is then retracted until the axially adjustable means on the tool holding portion engages the stop means on said one end of the adapter to establish the correct distance between the reference plane and work contacting end of the tool.

2. An apparatus of the class described comprising in combination an axially extending adapter, said adapter having an axially movable tapered socket mounted therein, means for moving said tapered socket, a tool holding portion, said tool holding portion having a tapered end sized to closely fit inside the tapered socket and having means thereon for releasably holding an axially extending tool, fixed means in said tapered socket for engaging the fixed portion of said tapered end of said tool holding portion to releasably lock the tapered end inside said socket, axially movable means on said tool holding portion for adjusting the distance between a part of said axially movable means and the work contacting end of the tool locked in the tool holding portion, one end of said adapter having means thereon for coacting with said axially adjustable movable means to provide a stop and to establish a reference plane on said adapter with respect to the work contacting end of said tool, means for moving said tapered socket so said fixed means can engage said fixed portion of the tapered end of said tool holding portion to releasably lock said tapered end inside said socket regardless of the adjustment of said axially movable means on said tool holding portion, whereby the tool holding portion in the tapered socket can be quickly and easily removed, readjusted, and replaced without disturbing the required distance between said reference plane and the work contacting end of the tool.

3. An apparatus of the class described comprising in combination an axially extending adapter, said adapter having a tapered socket therein, a tool holding portion, said tool holding portion having a tapered end sized to closely fit inside a tapered socket and having means thereon for releasably holding an axially extending tool, axially movable means on said tool holding portion for adjusting the distance between a part of said axially movable means and the work contacting end of the tool locked in said tool holding portion, one end of said adapter having means thereon for coacting with said axially adjustable movable means to establish a reference plane on said adapter with respect to the work contacting end of the tool, means movable relative to said tapered end for engaging a fixed portion of the tapered end of said tool holding portion to provide a stop and to releasably lock said tapered end inside said socket regardless of the adjustment of said axially movable means of said tool holding portion whereby the tool holding portion of the tapered socket can be quickly and easily removed, readjusted, and replaced without disturbing the required distance between said reference plane and the work contacting end of the tool.

4. An apparatus of the class described comprising in combination an axially extending adapter, said adapter having a tapered socket therein, a tool holding portion, said tool holding portion having a tapered end sized to closely fit inside said tapered socket and having means thereon for releasably holding an axially extending tool, axially movable means on said tool holding portion for adjusting the distance between a part of said of said axially movable means and the work contacting end of the tool locked in said tool holding portion, one end of said adapter having means thereon for coacting with said axially adjustable means to provide a stop and to establish a reference plane on said adapter with respect to said work contacting end of the tool, axially adjustable means associated with said tapered socket and said tapered end of the tool holding portion for releasably locking said tapered end inside said tapered socket regardless of the adjustment of said axially movable means of said tool holding portion whereby the tool holding portion can be quickly and easily removed, readjusted and replaced while maintaining the required distance between said reference plane and the work contacting end of the tool.

5. The apparatus set forth in claim 4 wherein said tool holding portion includes a threaded cylindrical portion integral with said tapered end and said axially movable means on said tool holding portion comprises a nut threaded onto said cylindrical portion.

6. The apparatus described in claim 5 wherein said one end of the adapter has a flat surface formed therein and the surface of the nut remote from the work contacting end of the tool has a flat surface for engaging said flat surface of said adapter to provide a reference plane with respect to the work contacting end of the tool.

7. An apparatus of the class described comprising is combination an axially extending adapter, one end of said adapter having a bore formed therein, a cup movably mounted in said bore, said bore having a tapered interior serving as a tapered socket, a tool holding portion, said tool holding portion having a threaded cylindrical part and an integral tapered end sized to closely fit inside said tapered socket and having means thereon for releasably holding an axially extending tool, fixed means in said cup for engaging a fixed portion of said tapered end of said tool holding portion to releasably lock the tapered end inside said tapered socket, a nut threaded onto the threaded cylindrical part of the tool holding portion for axial movement thereon, said one end of the adapter having means thereon for coacting with at least a part of the surface of the nut remote from the work contacting end of the tool to provide a stop and to establish a reference plane and said adapter with respect to the work contacting end of the tool, means for axially moving said cup so said fixed means in said cup can engage said fixed portion of said tapered end of said tool holding portion to releasably lock said tapered end in said tapered socket regardless of the adjustment of said nut on said cylindrical portion whereby when the tool needs to be repaired or preset the tool holding portion with the tool inside is released from the tapered socket and after repair the nut is readjusted on the cylindrical portion to establish the correct distance between said part of the nut and the work contacting end of the tool and the tapered end of the tool holding portion is then reinserted inside the tapered socket while the cup is moved so the fixed means on the cup engages said fixed portion of the tapered end so that the tapered end of the tool holding portion is locked inside the cup, and the cup is then retracted until said part of the surface of the nut engages said stop on said adapter to provide a reference plane and to establish the correct distance between the reference plane and the work contacting end of the tool.

8. The apparatus set forth in claim 7 wherein said fixed means in said cup comprises a pin rigidly mounted in said cup and projecting into said tapered socket and said fixed portion of said tapered end of said tool holding portion having a bayonet slot formed on the outer periphery of said tapered end for receiving said pin whereby the tapered end of said tool holding portion is releasably locked in said tapered socket.

9. The apparatus described in claim 7 wherein said one end of said adapter has a flat surface formed therein, the surface of said nut remote from the work contacting end of the tool flat for engaging said flat surface of said adapter to provide a stop and a reference plane with respect to the work contacting end of the tool.

10. The apparatus set forth in claim 9 including means for locking said nut in any rotative position over the threaded cylindrical part of the tool holding portion.

11. The apparatus set forth in claim 7 wherein said means for axially moving said cup comprises a groove formed in the outer surface of the cup, a bore extending through said adapter, a plug rotatably mounted in said bore, a pin integrally secured to the inner end of said plug and eccentric to the axis of the plug, said pin penetrating said groove in said cup, said groove orientated so rotation of said plug causes the pin in said groove to cause the cup to reciprocate axially in said adapter.

12. The apparatus set forth in claim 11 including means for locking said cup in any axial position in said adapter.

13. An apparatus of the class described comprising in combination an axially extending adapter, a tool holding portion, said tool holding portion and said adapter having tapered means whereby said adapter and said tool holding portion can fit together in said tapered means, said tool holding portion having means thereon for releasably holding an axially extending tool, axially movable means on said tool holding portion for adjusting the distance between a part of said axially movable means and the work contacting end of the tool locked in said tool holding portion, one end of said adapter having means thereon for coacting with said axially adjustable means to provide a stop and to establish a reference plane on said adapter with respect to said work contacting end of the tool, axially adjustable means associated with said tapered means for releasably locking said adapter and said tool holding portion together regardless of the adjustment of said axially movable means on said tool holding portion whereby the tool holding portion can be quickly and easily removed, readjusted, and replaced while maintaining the required distance between said reference plane and the work contacting end of the tool.

References Cited

UNITED STATES PATENTS 1,904,641   4/1933   Archea _____ 90—11.1

FOREIGN PATENTS 894,545   4/1962   Great Britain.

ANDREW R. JUHASZ, *Primary Examiner.*

G. WEIDENFELD, *Assistant Examiner.*

U.S. Cl. X.R.

279—9